Oct. 25, 1960  M. MASEL  2,958,029
AIRCRAFT MOTOR CONTROL SYSTEM
Filed May 13, 1955
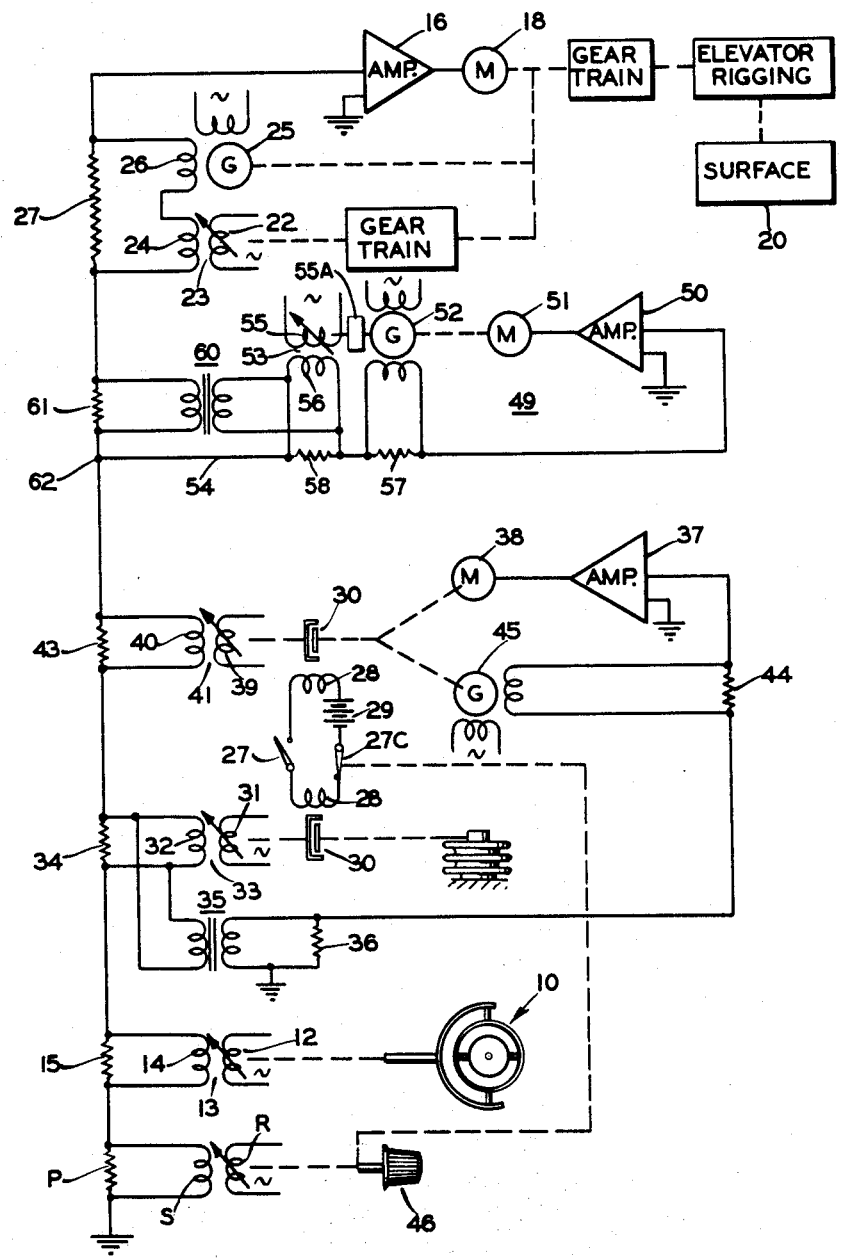
INVENTOR.
MARVIN MASEL
BY
Oscar B Brumback
ATTORNEY “United States Patent Office 2,958,029
Patented Oct. 25, 1960

2,958,029

AIRCRAFT MOTOR CONTROL SYSTEM

Marvin Masel, Hackensack, N.J., assignor to The Bendix Corporation, a corporation of Delaware Filed May 13, 1955, Ser. No. 508,015

12 Claims. (Cl. 318—489)

This invention relates generally to automatic control systems for aircraft and, more particularly, to a control system with provision for reducing slow oscillations of an aircraft when flight is controlled automatically.

Various factors such as "gusts" may cause short period or transient disturbances of an aircraft about one of its axes. Although the automatic control system corrects these disturbances, it may exhibit a tendency to cause the craft to oscillate about one or more of its axes at a relatively slow rate. These long period oscillations about the pitch axis are popularly referred to as "porpoising." Among the factors causing a tendency toward slow oscillation about the pitch axis are the erection of vertical gyro and the friction, back-lash, and compliance of the elevator control linkages.

Erection of the vertical gyro is required because the spin axis of the gyro tends to remain upright in space regardless of motions of the craft. This establishes a reference relative to space. Since the reference must be established relative to the earth's surface to provide pitch and roll references for the craft, the spin axis of the gyro must be constrained to remain upright relative to the earth's surface. Thus, the gyro is provided with an erection system which usually applies torques to the vertical gyro in such a manner as to align the spin axis with the dynamic vertical.

Since the dynamic vertical is the direction that a pendulum will hang, this vertical and the vertical due to the force of gravity coincide, provided the longitudinal acceleration is zero. However, the longitudinal acceleration of a "porpoising" aircraft is not zero but varies substantially sinusoidally with time. For example, at the instant of largest positive (nose up) pitch attitude, the craft is slowing down most rapidly and the forward acceleration attains its largest negative value. Due to this finite acceleration condition, the net effect of the erection system is to reduce the magnitude of the pitch attitude error signal for a given true pitch attitude error on a long time basis. The cable stretch, friction and backlash of the rigging system connecting the surface actuator and the surface and the loss of gain of the surface actuator due to the loading effect of aerodynamic hinge moments on the surface having an analogous effect in that the angular deflection of the control surface per unit of attitude error is reduced.

Since the "porpoising" is due to a long period oscillation of the craft, it is desirable to increase the gain of the control system on a long time basis; the gain of the control system referring to the degree of control surface rotation per degree of rotation of the craft about one of its axes. However, increasing the gain of the control system independently of the frequency of oscillation may result in short period oscillations of the aircraft.

In accordance with the present invention, the gain of the control system is increased on a long time basis without increasing the gain of the system on a short time basis. As an example, if a constant pitch attitude error signal of one degree displacement of the craft from the reference attitude were to be applied to the control system, the elevator surface might immediately be rotated one degree. In accordance with the invention, the rotation of the surface should then gradually be increased so that, after a period of twenty seconds, a surface rotation of five degrees would have occurred. To suppress the "porpoising" or long period oscillations while the craft is on constant altitude control, the quantity (for example, the sum of the pitch attitude error, the altitude error, and the integral of the altitude error signals) represented by the rotation of elevator surface to the given voltage, should be greater on a long time basis than on a short time basis.

An object of the present invention, therefore, is to provide a novel automatic control apparatus for reducing long period oscillations of a craft about its axis.

Another object of the invention is to provide a novel apparatus for maintaining a desirable ratio of airplane control surface deflection to attitude or position error on a short time basis and increasing this ratio on a long time basis.

The present invention contemplates an automatic control system having a power means operated in response to the displacement of the craft from a reference attitude or position to move a control surface so as to return the craft to reference attitude or position and provided with a network for receiving the reference signal and developing an additional output for the power means, the value of this output decreasing with respect to the value of the input as the frequency of the input signal increases.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

In the single sheet of drawings, a single channel of an automatic control system is illustrated incoroprating the novel device of the present invention.

A conventional automatic pilot installation is comprised of three control channels: pitch, roll and yaw. For purposes of simplicity, however, only the pitch channel of the automatic pilot installation has been illustrated. It should be recognized, though, that the same principles will apply with respect to the other channels, and that other equipment not shown may be included in the same channel.

The attitude reference for the craft is provided by a conventional vertical gyro 10 provided with an erection system (not shown). In a known manner, gyro 10 actuates the rotor 12 of an inductive device 13 to develop at stator 14 a signal whose amplitude and phase corresponds to the extent and direction of displacement of the craft in pitch from a reference pitch attitude. This signal is applied by way of resistor 15 and a series signal chain to a discriminator type amplifier 16 whose resulting output operates an induction motor 18 in a clockwise or counter-clockwise direction to displace an elevator surface 20 to correct the pitch attitude deviation.

Motor 18 also displaces the rotor 22 of an inductive device 23 relative to its stator 24 to develop at the stator a signal corresponding in amplitude and phase to the extent and direction of displacement of the elevator surface from a normal position. A rate generator 25 prevents the motor from overrunning the assigned position because of the kinetic energy of moving parts by developing a signal at winding 26 corresponding in amplitude and phase to the rate and direction of motor operation. These rate and surface position follow up signals are combined at resistor 27 and are applied to amplifier 16 in opposition to the displacement signal from inductive device 13.

When the craft is in a steady state straight and level flight and in trim condition, the input signal to amplifier 16 is zero and the signals from devices 13, 23, and 25 are zero. Any displacement of the craft in pitch, however, displaces rotor 12 relative to stator 14 to develop a pitch attitude signal for amplifier 16. In response, motor 18 operates elevator 20 until the combined rate and follow up signals from inductive device 23 and rate generator 25 are equal and opposite to the attitude signal. The net input to amplifier 16 is zero and motor 18 stops with the elevator surface displaced an amount to return the craft to reference attitude.

As the displaced surface returns the craft to the reference attitude, the signal from inductive device 13 decreases and the follow up signal from inductive device 23 prevails to return the elevator surface to normal position. Thus, the surface is in normal position as the craft reaches the reference attitude and the net input to amplifier 16 is zero.

An altitude control such as described in Patent No. 2,512,902, issued to Rossire on June 27, 1950, may be provided to maintain the craft at a constant altitude level. In the embodiment herein, a switch 27 is moved to a closed circuit position when the craft reaches the predetermined altitude. This energizes coils 28 from battery 29 and engages clutches 30. Thereafter, any displacement of the craft from this engaged altitude causes aneroid 68 to displace rotor 31 relative to stator 32 of inductive device 33 and develops at resistor 34 a signal corresponding in amplitude and phase to the extent and direction of displacement. By way of coupling transformer 35, the altitude signal from stator 32 is also coupled across resistor 36 and through amplifier 37 operates motor 38 to drive rotor 39 relative to stator 40 of inductive device 41 to develop across resistor 43 a signal corresponding in amplitude and phase to the time integral of and direction of the altitude error signal. The signal across resistor 44 developed by rate generator 45 corresponds in amplitude and phase to the rate and direction of motor operation. These altitude and integral signals across resistors 34 and 43 operate elevator servomotor 18 to maintain the craft at a constant altitude level.

A manual controller 46 may be provided to change the pitch attitude of the craft for trim or other purposes by displacing rotor R of inductive device 47 relative to stator S and to develop a corresponding signal across potentiometer P. Switch 27C is opened when the controller is displaced from center position.

Due to the erection system for gyroscope 10, and the friction, compliance, and back-lash of the linkages and cables for the surface, the automatic pilot so far described may exhibit a tendency to cause slow oscillations of the craft about the pitch axis. In accordance with the present invention, the signals from the vertical gyro and altitude controls are amplified through a lag network 49 to provide an additional signal for the amplifier to reduce any long period oscillation.

Network 49 comprises an amplifier 50, a servomotor 51, a rate generator 52 and an inductive device 53. In response to an input signal at lead 54, amplifier 50 operates servomotor 51 which, in turn, drives through a suitable low speed drive or reduction gearing 55A a rotor 55 so as to displace the rotor 55 relative to stator 56 of inductive device 53 to develop a signal across resistor 58 corresponding in amplitude and phase to the extent and direction of motor operation of the rotor 55. Motor 51 also actuates through a suitable high speed drive a rate generator 52 so as to develop across resistor 57 a signal corresponding in amplitude and phase to the rate and direction of motor operation. These two signals are applied to amplifier 50 in opposition to the input signal at lead 54; and as the signals build up to a value equal and opposite the input signal, servomotor 51 stops.

When the frequency of craft displacement is high so that the time duration of the signal is short, motor 51 cannot effectively respond to the signal or drive the rotor 55 through the low speed drive 55A to an angular position corresponding to the extent of the craft displacement, because of the high value of the output of rate generator 52 when motor 51 operates at a rapid rate in seeking to respond to fluctuations in craft displacement of high frequency. Accordingly, the short life signals applied to lead 54 and due to short time oscillations and disturbances do not result in additional components being developed at inductive device 53 to zero the input to amplifier 50. However, when the oscillations are at a relatively slow rate, motor 51 is able to respond to the signal and displace rotor 55 through the low speed drive 55A to an angular position corresponding substantially to the extent of the craft displacement so as to develop a signal to substantially cancel the input to amplifier 50.

The signal from stator 56 is also applied to amplifier 16 by way of coupling transformer 60 and resistor 61. This signal is phased to operate servomotor 18 in the same direction as the signal which appears at junction 62. Thus, when this signal is due to displacement of rotor 12 and stator 14, network 49 develops a signal to add to the attitude signal which is sustained for a period of time. Thus, the lag network 49 provides an additional signal to reduce the long period oscillations of the craft yet is ineffective to provide a signal for the short period oscillations due to gusts or other transient effects. The degenerative effect of the signal from inductive device 53 on the signal chain to amplifier 50 in each case returns rotor 55 to a no signal position as soon as the input signal at lead 54 disappears.

The foregoing has presented a novel automatic control system for aircraft in which short period control effects are unchanged but has an additional component added to long period control effects so as to reduce the slow oscillations of the craft about the flight path.

Although only one embodiment of the invention has been illustrated and described in detail, it is to be expressly understood that invention is not limited thereto. Various changes can be made in the design and arrangement of the parts without departing from the spirit and scope of the invention as will now be understood by those skilled in the art.

What is claimed:

1. In a control system for a craft having a movable surface, power means for moving said surface, means responsive to deviation of said craft from a predetermined attitude for actuating a first signal device to develop a corresponding attitude signal, said power means being operable in response to said signal to displace said surface, a second signal device actuated by said power means for developing a follow up signal for opposing said attitude signal, a third signal device, a motor responsive to said attitude signal for actuating said third signal device for developing a third signal, said motor being operable in response to the difference between said first and third signals, means for opposing said motor operation by a signal corresponding to the rate of motor operation whereby said motor is rendered ineffective to respond to attitude signals of short duration, and other means for applying signals from said first and third signal devices in an aiding relationship to provide a resultant signal which is in opposed relation to the signal from said second signal device to effect operation of said power means in response to an attitude signal of relatively longer duration.

2. In a control system, a pair of signal devices, means responsive to the deviation of the value of a condition from a reference value for actuation of the first of said signal devices to develop a signal corresponding in magnitude and sense to the extent and direction of deviation, a motor operable for actuating the second of said signal devices to develop a second signal corresponding in magnitude and sense to the extent and direction of motor operation, means operable by said motor for developing a third signal corresponding in magnitude and phase to the rate and direction of motor operation, means combining said signals in a relationship such that said first and second signals oppose each other and said third signal opposes motor operation to provide a resultant signal for operating said motor, further means combining said first and second signals in additive relation to provide a resultant signal, and means for utilizing said last named signal.

3. In a control system, a pair of signal devices, means responsive to the deviation of the value of a condition from a reference value for actuation of the first of said signal devices to develop a signal corresponding in magnitude and sense to the extent and direction of deviation, said deviation being transient for relatively rapid and sustained for relatively slow oscillations, a motor operable for actuating the second of said signal devices to develop a second signal corresponding in magnitude and sense to the extent and direction of motor operation, means operable by said motor for developing a third signal corresponding in magnitude and phase to the rate and direction of motor operation, means combining said signals in a relationship such that said first and second signals oppose each other and said third signal opposes motor operation to provide a resultant signal for operating said motor, said third signal having such a magnitude during rapid operation that said motor is unable to effectively follow said transient deviation but is able to follow said sustained deviation, further means combining said first and second signals in additive relation to provide a resultant signal, whereby said last named signal corresponds to said deviation for said rapid oscillations and is greater than said deviation for said slow oscillations, and means for utilizing said last named signal.

4. A system for moving a craft control member, comprising means responsive to deviation of said craft from a reference altitude for developing a signal corresponding to said deviation, said deviations being of a relatively slow nature and of a relatively sustained nature, means responsive to said signal when said deviation is sustained for developing a signal proportional to said deviation signal, and power means for moving said member operable under the control of said deviation and proportional signals in aiding relation whereby said power means is operated by a signal proportional to the deviation of said craft for a rapid deviation and is operated by a signal greater than said deviation for a sustained deviation.

5. In a control system for a craft having a movable member for controlling the craft, means responsive to deviation of said craft from a reference attitude for developing a signal corresponding to said deviation, said deviations being relatively rapid and relatively sustained, means responsive to said signal when said deviation is sustained for developing a signal proportional to said deviation signal, and power means for moving said member operable under the control of said deviation and proportional signals in aiding relation whereby a signal proportional to the deviation of said craft operates said power means during said rapid deviation and a signal greater than said deviation operates said power means during said sustained deviation.

6. A control system for displacing a member for controlling a craft, comprising means responsive to deviation of said craft from a reference condition for developing a signal corresponding to said deviation, said deviations existing for relatively short and relatively long periods of time, means responsive to said signal for reproducing said signal when said deviations exist for said long period, the extent of said reproduction decreasing with the rapidity with which said signal disappears, and power means operable under the control of said signals in aiding relation for displacing said member.

7. Means for providing a first signal, a two part signal generator having one part movable relative to the other part to produce a second signal, means for combining said signals in an auxiliary control circuit to provide a third signal corresponding to the difference between said first and second signals, means responsive to said third signal for relatively displacing said two parts of said signal generator to produce said second signal to reduce said third signal to zero, and other means to apply said second signal in a main control circuit in additive relation to said first signal upon a sustained deviation in said first signal.

8. A system for moving a craft control member, comprising means responsive to deviation of said craft from a reference pitch attitude for developing an attitude signal corresponding to said deviation, means responsive to deviation of said craft from a reference altitude for developing a signal corresponding to said altitude deviation, said deviations having a relatively rapid nature and a relatively sustained nature, means for summing said signals, means responsive to said signal summation when said deviations are sustained for developing a signal proportional to said summation signal, and power means operable under the control of said signal summation and said developed signal in aiding relation for moving said member.

9. A system for moving a craft control member, comprising means responsive to deviation of said craft from a reference pitch attitude for developing an attitude signal corresponding to said deviation, means responsive to deviation of said craft from a reference altitude for developing a signal corresponding to said altitude deviation, said deviations having a relatively rapid nature and a relatively sustained nature, means responsive to said last-mentioned signal to develop another signal corresponding to the time integral of the altitude deviation, means for summing said signals, means responsive to said signal summation when at least one of said deviations is of the relatively sustained nature for developing another signal proportional to said summation signal, means for applying said other signal in aiding relation to said summation signal, and power means operable under control of said summation and other signals for moving said member.

10. A system for moving a craft control member, comprising means responsive to a deviation of said craft from a reference altitude for developing a signal corresponding to said altitude deviation, such deviations in altitude having a relatively rapid nature and a relatively sustained nature, means responsive to said last-mentioned signal to develop another signal corresponding to the time integral of the altitude deviation, means for summing said signals, means responsive to said signal summation when said deviation is of the relatively sustained nature for developing another signal proportional to said summation signal, means for applying said other signal in aiding relation to said summation signal, and power means operable under the control of said summation and other signals for moving said member.

11. A system for moving a craft control member, comprising means responsive to deviation of said craft from a reference condition for developing a signal corresponding to said deviation, such a deviation existing for either a relatively short or a relatively long period of time, means responsive to said signal and effective when said deviation is for the relatively long period of time for developing another signal proportional to said first-mentioned signal, a device rendering said last-mentioned means ineffective when the deviation is for the relatively short period of time, means for applying said other signal in aiding relation to said first-mentioned signal, and power means operable under control of said first-mentioned and other signals for moving said member.

12. A system for moving a craft control member, comprising means responsive to a deviation of said craft from a reference condition for developing a corresponding signal, such deviation being either of a relatively rapid nature or of a relatively sustained nature, means responsive to components of said last-mentioned craft deviation signal to develop another signal upon said deviation being of the relatively sustained nature, means to render said other signal developing means ineffective to develop said other signal upon said deviation being of the relatively rapid nature, means for applying said other signal in aiding relation to said first-mentioned signal, and power means operable under control of said first-mentioned signal and said other signal for moving said member.

References Cited in the file of this patent

UNITED STATES PATENTS

| | | |
|---|---|---|
| 2,512,902 | Rossire | June 27, 1950 |
| 2,568,719 | Curry | Sept. 25, 1951 |
| 2,664,530 | Young | Dec. 29, 1953 |
| 2,740,082 | Sedgfield | Mar. 27, 1956 |